DEVELOPER REPLENISHING PROGRAMMING SYSTEM

Filed May 24, 1968 10 Sheets-Sheet 1

INVENTOR.
CHARLES D. WILSON
BY B. A. Chiama
Norman P. Schneider
ATTORNEYS

INVENTOR.
CHARLES D. WILSON
BY B. A. Chesna
Norman P. Schneider
ATTORNEYS

INVENTOR.
CHARLES D. WILSON
BY B. A. Chesna
Norman P. Schroeder
ATTORNEYS

DEVELOPER REPLENISHING PROGRAMMING SYSTEM

Filed May 24, 1968 10 Sheets-Sheet 4

INVENTOR.
CHARLES D. WILSON

BY B. A. Chearing
Norman C. Schunder
ATTORNEYS

INVENTOR.
CHARLES D. WILSON
BY
ATTORNEYS

INVENTOR.
CHARLES D. WILSON

BY B. A. Chiaro
Norman P. Schroeder
ATTORNEYS

*INVENTOR.*
CHARLES D. WILSON

*BY* B. A. Chyenne
Norman P. Schneider
*ATTORNEYS*

DEVELOPER REPLENISHING PROGRAMMING SYSTEM

Filed May 24, 1968

INVENTOR.
CHARLES D. WILSON
BY
B. A. Chesnar
Homer P. Schaefer
ATTORNEYS

INVENTOR.
CHARLES D. WILSON
BY
ATTORNEYS

DEVELOPER REPLENISHING PROGRAMMING SYSTEM

Filed May 24, 1968

INVENTOR.
CHARLES D. WILSON

BY

B. A. Chiona
[signature]
ATTORNEYS 3,527,387
Patented Sept. 8, 1970

3,527,387

DEVELOPER REPLENISHING PROGRAMMING SYSTEM

Charles D. Wilson, Rochester, N.Y., assignor to Xerox Corporation, Rochester, N.Y., a corporation of New York Filed May 24, 1968, Ser. No. 731,966
Int. Cl. B67d 5/08
U.S. Cl. 222—57 8 Claims

ABSTRACT OF THE DISCLOSURE

A toner dispensing and control system therefor having means for periodically accumulating toner for a predetermined time interval and for periodically measuring the accumulation thereof for another predetermined time interval wherein the time intervals are asymmetrical. In the event toner accumulation falls below a predetermined value, a predetermined amount of toner is dispensed in the developing system using the dispensing and control system.

This invention relates to developing apparatus and particularly, to improvements in a toner replenishing control system particularly adapted for use with photoconductor belts in automatic copiers/reproducers that are constructed for high speed operation and capable of having their sequence timing varied thereby permitting variable speeds of output.

As is well known in recent years, the steadily increasing size of various industries has required an enormous increase in the amount of paper work that must be accomplished, maintained and made available for wide interplant circulation. In the present day commercial automatic copiers/reproduction machines, which are adapted to produce copies of between 5 and 60 8" x 11" sheets of copy per minute, the photoreceptor device is in the form of a drum which rotates in timed unison relative to a plurality of processing stations and the usual developer system is limited as to the amount and the toner concentration of the developing material that can be conveyed to a development zone for the machine.

As one solution for overcoming the multitude of disadvantages for high speed copying, the latest machine concept for copiers utilizes flash exposure of a document and the arrangement of a moving photoconductor material in the form of a belt held in a flat condition at the instant of exposure. However, the use of photoconductor belts moving at high speeds require relatively fast flowing or moving developing material in order to effect good solid area development. With large quantities of developing material being consumed, there is a need for insuring at all times optimum mixture conditions of the developing mixture.

It is therefore the principal object of this invention to improve copiers/reproduction machines of the type having a fast moving photoconductor plate by maintaining the mixture relationship of toner particles and carrier beads at a predetermined proportion in order to assure optimum developing condition.

Another object of this invention is to control automatically the amount of toner particles in an electrostatic developing system.

These and other objects of this invention are obtained by means of a toner sensor arranged to receive a continuous stream of developer material and to sample the toner concentration of the material in this stream. During operation of the machine, the stream of material is directed across a pair of density sensing devices in the sensor and, periodically, the sensing devices are activated wherein toner density is compared to a predetermined density and the devices are conditioned for each subsequent sampling step.

For a better understanding of the invention as well as other objects and further features thereof, reference is had to the following detailed description of the invention to be read in conjunction with the accompanying drawings wherein.

Figure 1:
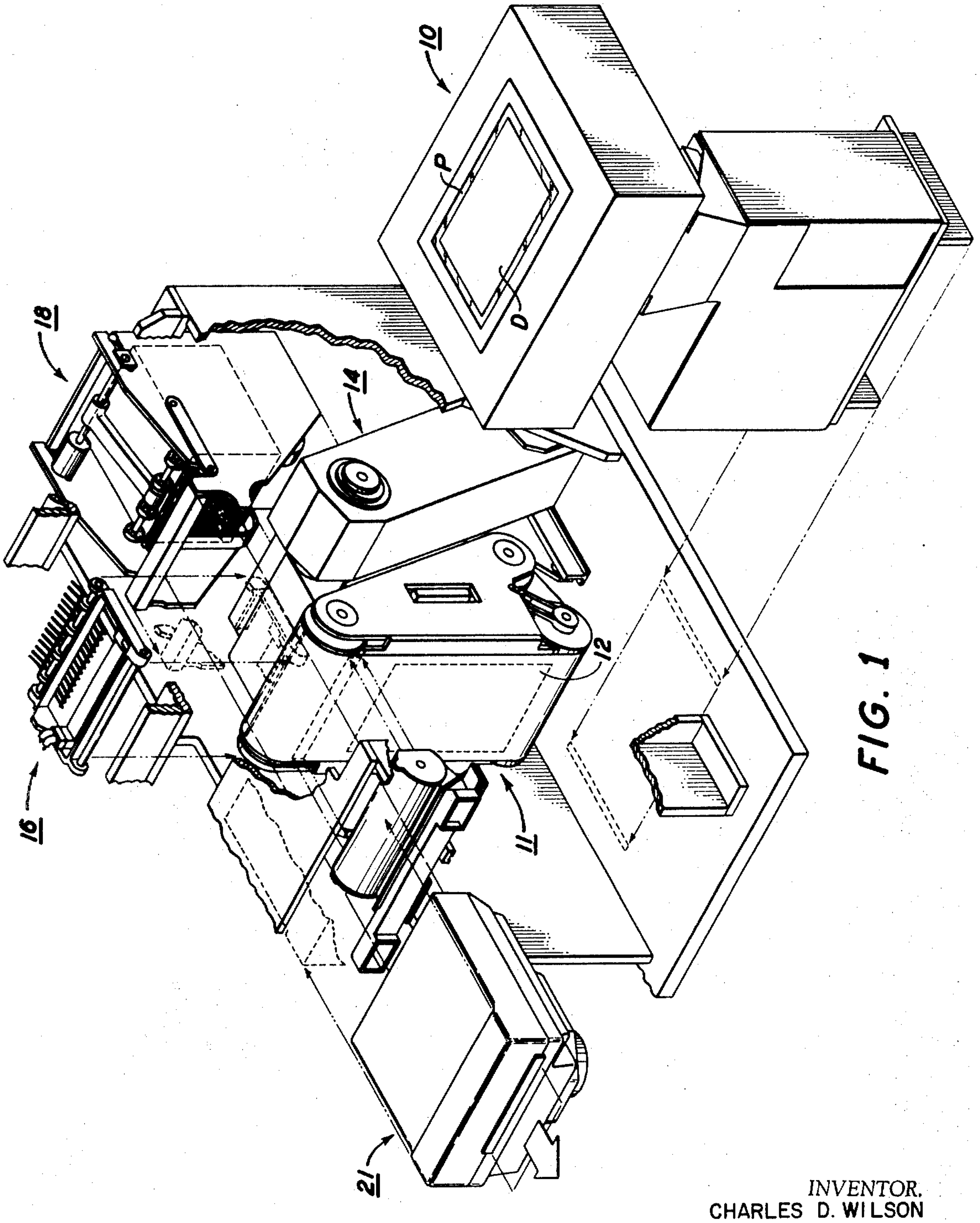
FIG. 1 is an exploded right-hand perspective view of a reproduction machine incorporating the present invention therein with the processing components separated to better illustrate the invention.
Figure 2:
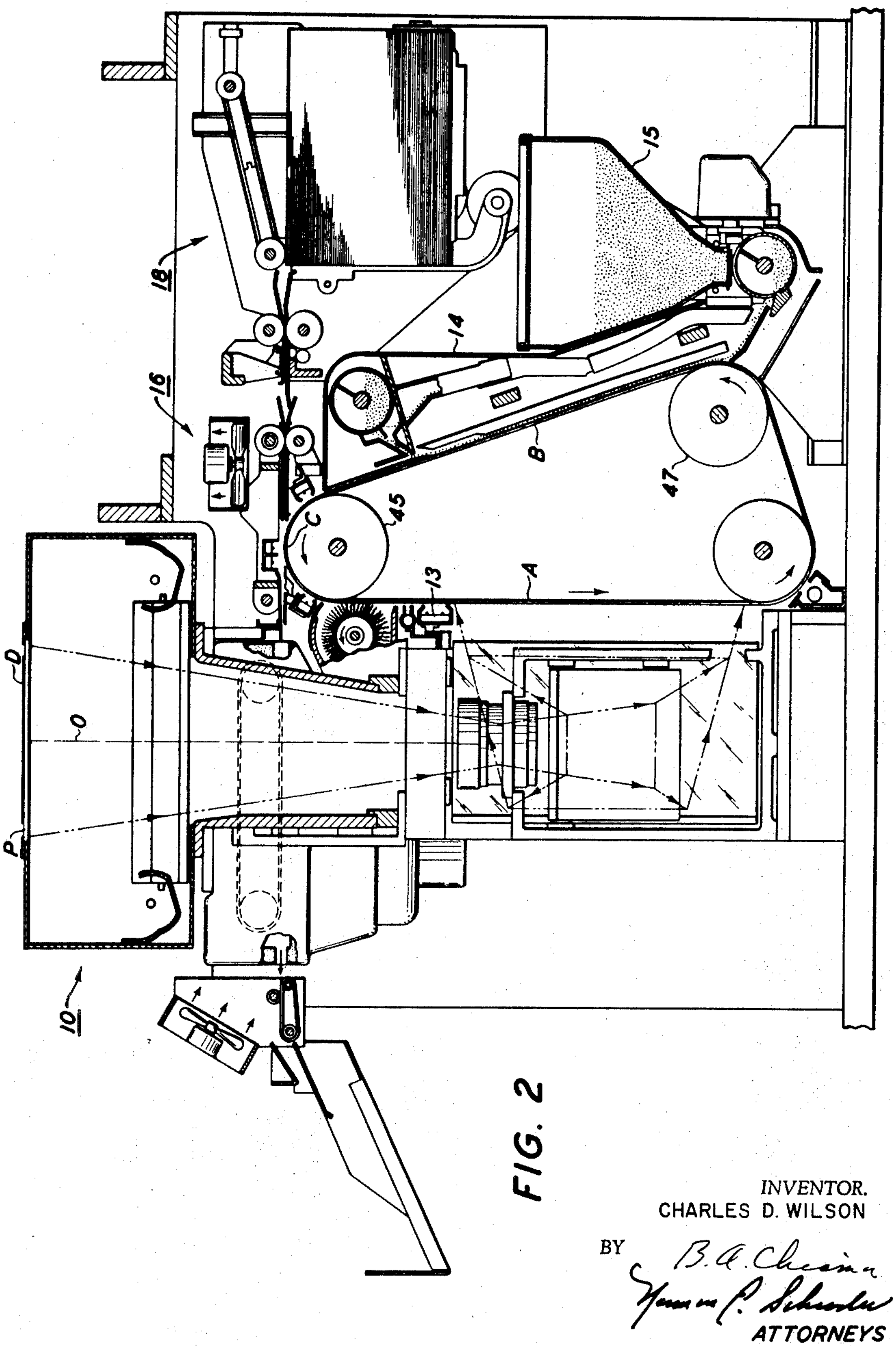
FIG. 2 is a schematic sectional view of the reproduction machine showing the various xerographic processing stations.

For a general understanding of the illustrated copier/reproduction machine, in which the invention may be incorporated, reference is had to FIGS. 1 and 2 in which the various system components for the machine are schematically illustrated. As in all electrostatic systems such as a xerographic machine of the type illustrated, a light image of a document to be reproduced is projected onto the sensitized surface of a xerographic plate to form an electrostatic latent image thereon. Thereafter, the latent image is developed with an oppositely charged developing material to form a xerographic powder image, corresponding to the latent image on the plate surface. The powder image is then electrostatically transferred to a support surface to which it may be fused by a fusing device whereby the powder image is caused permanently to adhere to the support surface.

In the illustrated machine, an original to be copied is placed upon a transparent support platen P fixedly arranged in an illumination assembly generally indicated by the reference numeral 10, arranged at the left end of the machine. While upon the platen, an illumination system, flashes light rays upon the original thereby producing image rays corresponding to the informational areas on the original. The image rays are projected by means of an optical system for exposing the photosensitive surface of a xerographic plate in the form of a flexible photoconductive belt arranged on a belt assembly generally indicated by the reference numeral 11.

The photoconductive belt assembly 11 is slidably mounted upon a support bracket secured to the frame of the machine and is adapted to drive a selenium belt 12 in the direction of the arrow as shown in FIG. 2 at a constant rate. During this movement of the belt, the reflected light image of an original on the platen is flashed upon the xerographic surface of the belt. The belt surface that intercepts the light rays comprises a layer of photoconductive material such as selenium on a conductive backing that is sensitized prior to exposure by means of a charging corona generator device indicated at 13.

The flash exposure of the belt surface to the light image discharges the photoconductive layer in the areas struck by light, whereby there remains on the belt a latent electrostatic image in image configuration corresponding to the light image projected from the original on the supporting platen. As the belt surface continues its movement, the electrostatic image passes through a developing station B in which there is positioned a developer assembly generally indicated by the reference numeral 14 and where the belt is maintained in a flat condition. The developer assembly 14 comprises horizontally and vertically conveying mechanisms which carry developing material to the upper part of the belt assembly 11 whereat the material is dispensed and directed to cascade down over the upwardly moving inclined selenium belt 12 in order to provide development of the electrostatic image.

As the developing material is cascaded over the xerographic plate, toner particles in the development material are deposited on the belt surface to form powder images. As toner powder images are formed, additional toner particles are supplied to the developing material in proportion to the amount of toner deposited on the belt during xerographic processing. For this purpose, a toner dispenser generally indicated by reference numeral 15 is used to accurately meter toner to the developer material in the developer assembly 14.

The developed electrostatic image is transported by the belt to a transfer station C whereat a sheet of copy paper is moved at a speed in synchronism with the moving belt in order to accomplish transfer of the developed image. There is provided at this station a sheet transport mechanism generally indicated at 16 adapted to transport sheets of paper from a paper handling mechanism generally indicated by the reference numeral 18 to the developed image on the belt at the station B.

After the sheet is stripped from the belt 12, it is conveyed into a fuser assembly generally indicated by the reference numeral 21 wherein the developed and transferred xerographic powder image on the sheet material is permanently affixed thereto. After fusing, the finished copy is discharged from the apparatus at a suitable point for collection externally of the apparatus.

Suitable drive means may be arranged to drive the selenium belt 12 in conjunction with timed flash exposure of an original to be copied, to effect conveying and cascade of toner material, to separate and feed sheets of paper and to transport the same across the transfer station C and to convey the sheet of paper through the fuser assembly in timed sequence to produce copies of the original.

It is believed that the foregoing description is sufficient for the purposes of this application to show the general operation of an electrostatic copier using an illumination system constructed in accordance with the invention. For further details concerning the specific construction of the electrostatic copier, reference is made to copending application Ser. No. 731,934, filed concurrently herewith in the name of Hewes et al.

In order to effect development of the electrostatic latent image on the selenium belt 12, the development system for the xerographic reproduction machine, shown in FIG. 2, includes a developer assembly 14 (see FIGS. 3–9) which coacts with the selenium belt 12 at the development zone B. At this development zone the charged exposed surface of the belt 12 is developed to form a powdered toner image of the original that was previously illuminated.

For this purpose, the developer assembly 14 is mounted adjacent to the belt assembly 11 to establish the development zone B. Mounted within the developer assembly 14 is a screw conveyor arrangement utilized in conjunction with an internal bucket conveyor belt for continuously circulating developer material previously supplied to the upper end of the developer assembly and from where the developer material is cascaded over the now inclined upperly moving selenium belt 12 in order to accomplish development of the latent image thereon. As the developer material cascades over the flat run of the belt 12, between the rollers 45, 47 upon which the belt 12 is mounted for movement, toner particles of the developing material adhere electrostatically to the previously formed electrostatic latent image areas on the belt, the remaining developer material falling off the lower portion of the belt assembly adjacent the roller 47 or the peripheral surface thereof to be deflected by suitable baffle plates into the bottom sump of the developer assembly 14. Toner particles consumed during the developing operation to form the visible powder toned image is replenished by the toner dispenser 15 mounted external to the developer assembly.

Figure 3:
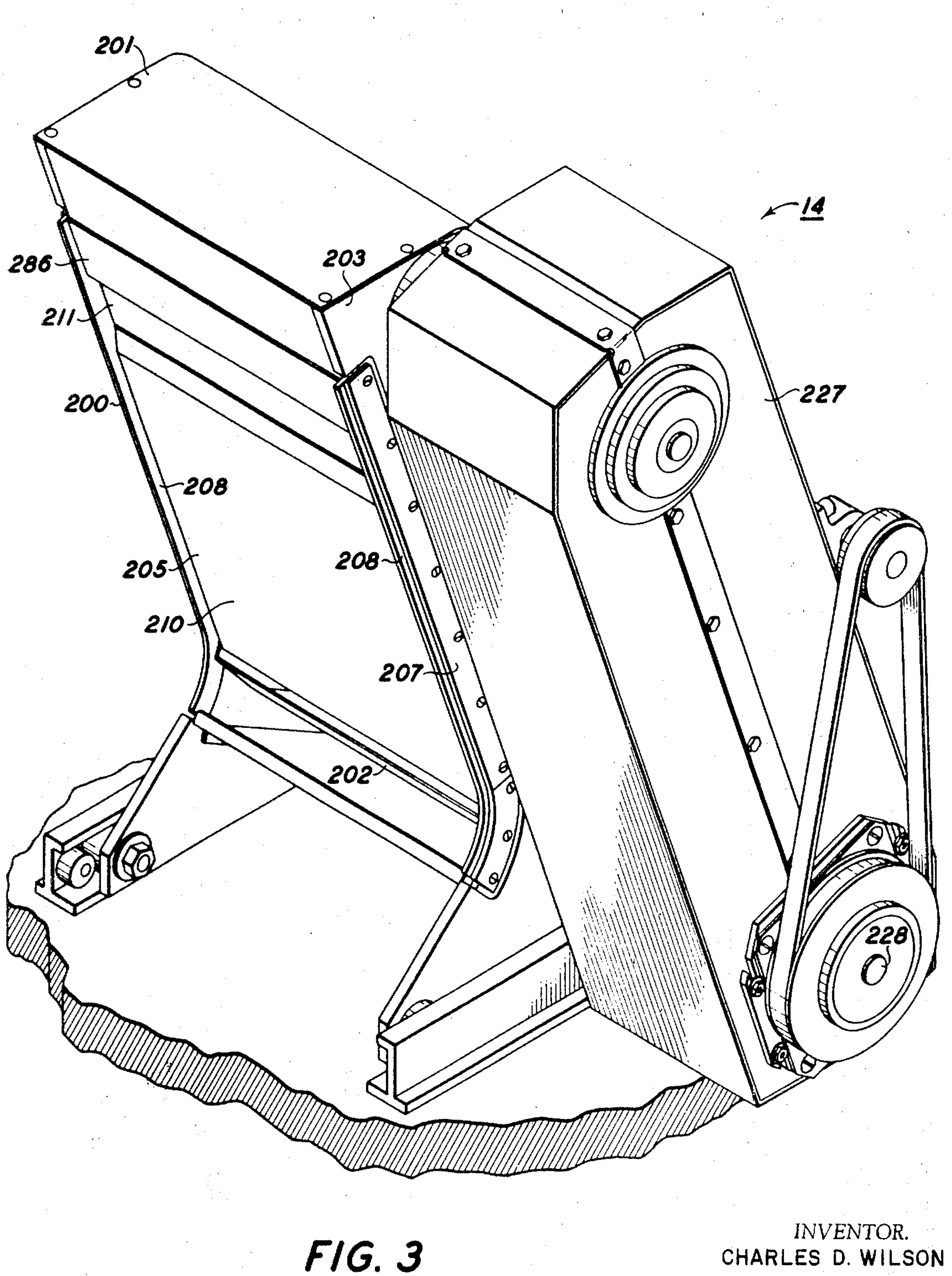
FIG. 3 is a perspective view of a developer apparatus as seen from the front of the machine away from association with the selenium belt utilized in the machine.
Figure 8:
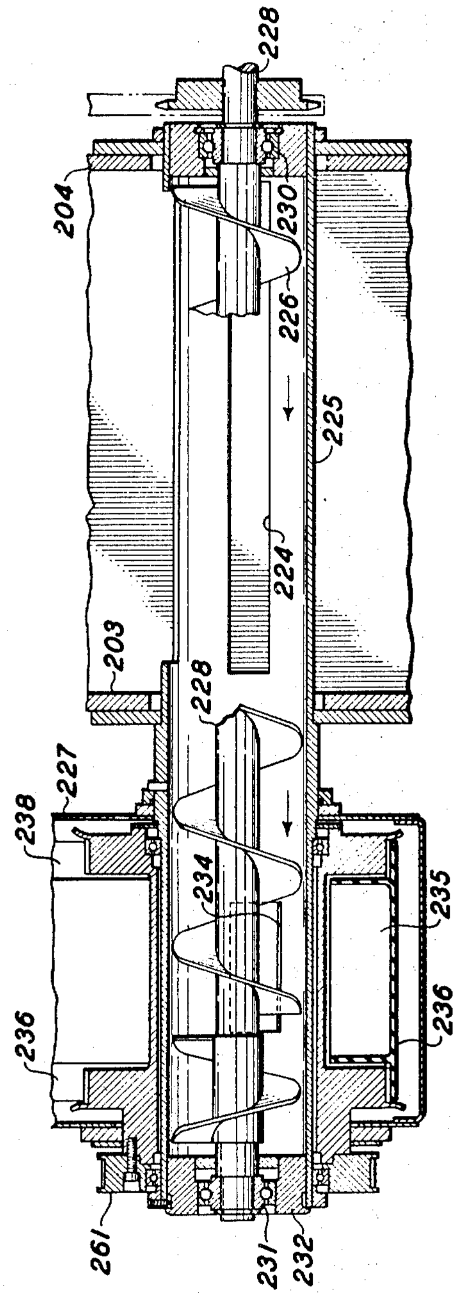
FIG. 8 is a cross-sectional view of the lower horizontal developing material transport device.

Specifically, the developing assembly 14 includes an elongated, vertically inclined, boxlike developer housing 200 having a top wall 201, a bottom wall 202 in the form of a toner pick-off baffle, side walls 203 and 204, front wall 205, and a rear wall 206. As shown in FIGS. 3 and 8, the side walls 203 and 204 are shaped with a vertically inclined straight edge portion and a lower curved portion in conformity with the shape the selenium belt 12 assumes during the development function of the machine, as defined by the adjacent portions of the belt roller 47 to permit the developer housing to be positioned closely adjacent to the belt. Secured to the inside faces of the side walls 203 and 204 are side baffle plates 207 which support upon and hold against the respective side plates a packing material in the form of strips 208 which extend slightly toward and against the selenium belt when the developer housing 200 is in operating position in order to prevent excessive dust and air currents from circulating within the developer zone adjacent the belt during a developing function.

In order to be disposed for high quality reproduction, the developing assembly is capable of accomplishing line copy development and solid area development. This is made available by use of a development electrode 210 mounted upon the housing 200 as the front wall 205. The development electrode 210 is positioned so as to assume a spaced relationship relative to the adjacent run of the selenium belt. The development electrode is shaped as a thin wall rectangular plate and includes a thinner walled narrow extension plate 211 which serves as an entrance chute for developer material and which is mounted on but electrically insulated from the top edge of the main electrode plate 210.

Figure 6:
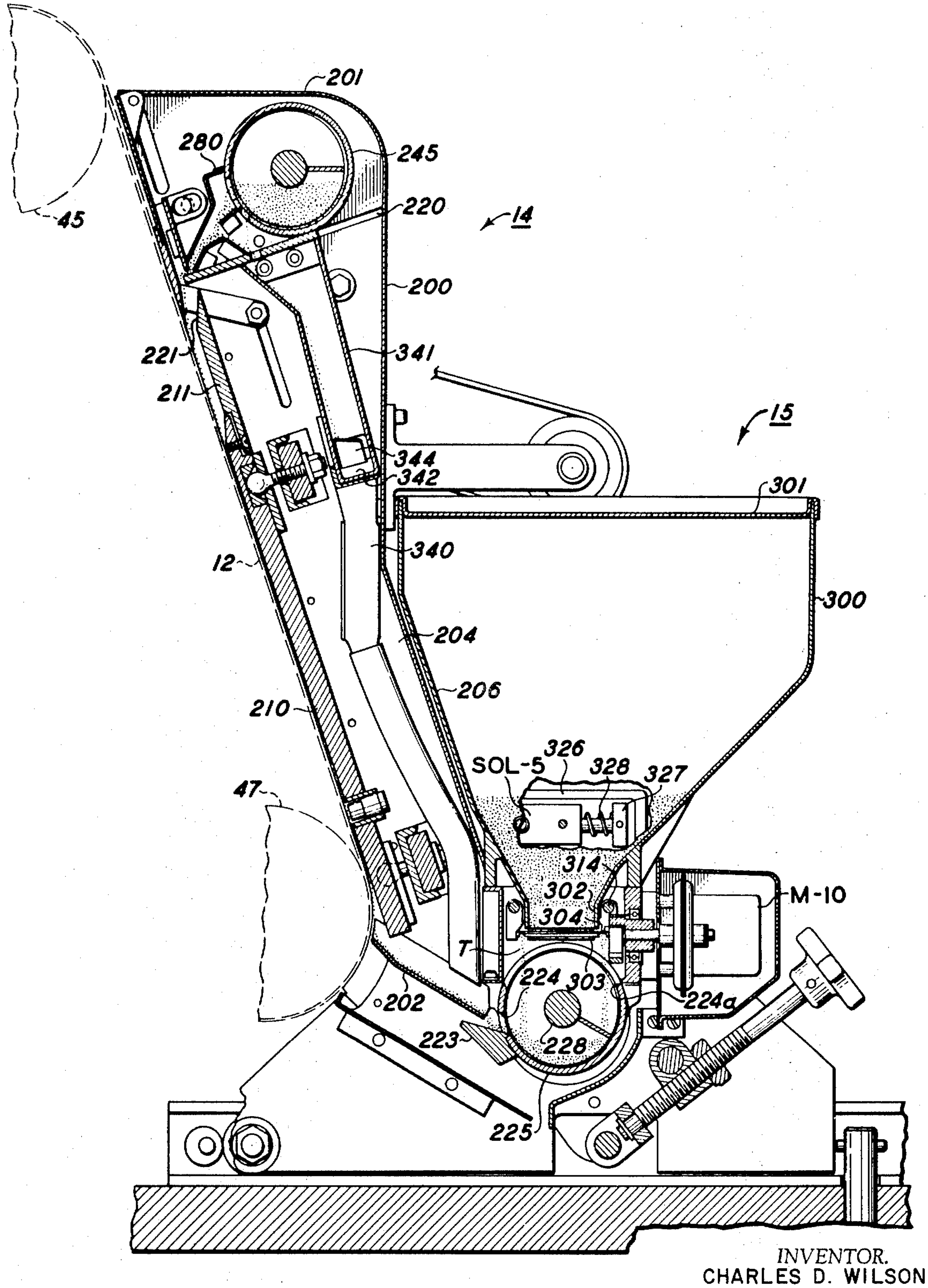
FIG. 6 is a cross-sectional view of the developer housing taken along the line 6—6 in FIG. 4.
Figure 7:
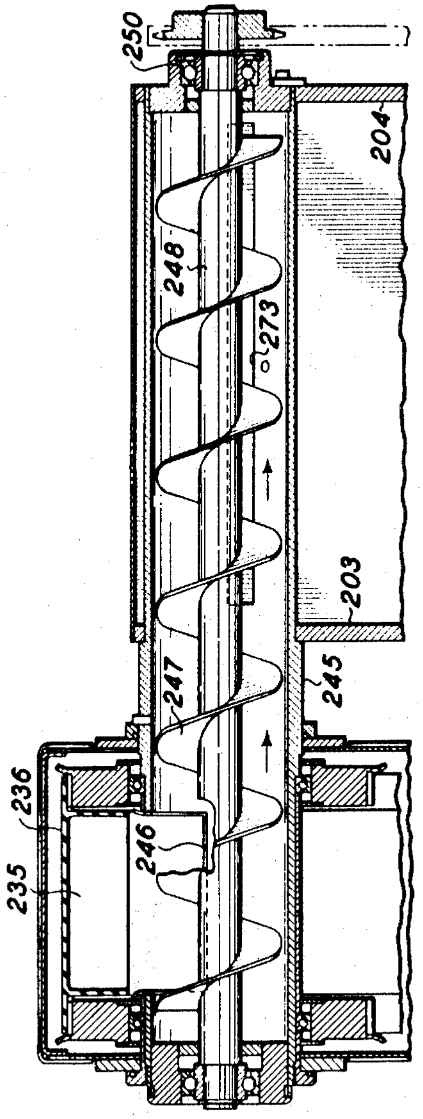
FIG. 7 is a cross-sectional view of the upper horizontal developing material transport device.

During the developing function, development material comprising very small diameter carrier beads having smaller toner particles electrostatically adhering thereto, is introduced in the space between the development electrode 210 and the adjacent run of the selenium belt 12. The development material is introduced along a thin slot formed between the belt 12 and the adjacent longitudinal edge of a plate 220 secured in the upper region of the developer housing 200. The development material then is cascaded downwardly and enters the space between the tapered portion 221 at the upper edge of the electrode entrance chute 211 which, as observed in FIG. 6, is spaced at a slightly greater distance from the belt 12 than is the lower main portion of the electrode. The development material then falls freely between the electrode portions and the selenium belt during which time and distance the toner particles are pulled away from the carrier beads by action of the electrostatic charged image on the belt 12.

Preferably, the development electrode 210 is spaced as close as possible taking in consideration that the spacing between electrode and the selenium belt 12 influences the electrostatic field strength and must be such that the cascading development material has sufficient spacing to be free to fall in cascading motion therebetween.

Denuded carrier particles and other toner particles which were not employed in developing the latent image and which have passed into the lower spacing between the plate 210 and the belt 12 are deflected upon the pick-off baffle 202 which is electrically biased and carries the particles back into a conveyor system for the development material. These particles are conveyed to a chute 223 extending across the entire width of the housing 200 and being suitably mounted on the side plates 203, 204 thereof. The toner particles and denuded carrier particles are directed by the chute 223 into a developer material return system comprising a first conveyor screw arrangement for conveying development material that has been cascaded over the surface of the belt 12, an internal bucket vertical conveying belt for conveying this material vertically to a position above the entrance chute 211 for the development electrode 210 and, a second conveyor screw for conveying the development material horizontally from the internal bucket conveyor belt to position developer in a sump which is in communication with the upper reaches of the spacing between the development electrode and the belt 12 preparatory to continuous recascading of the material across the selenium belt 12. The chute 223 directs developer material through an elongated slot 224 formed in a lower conveyor tube 225 secured to the side plates 203, 204 and extending out of the housing 200. The tube 25 houses a screw conveyor 26 which is continuously rotated during operation of the developer assembly and which functions to convey developer material horizontally out of the developer housing 200 and into a vertical return system.

Developer material is conveyed out of the developer housing 200 and into a developer return housing 227 mounted in spaced relation and parallel to the side plate 203 for the housing 200. The developer return housing has an elongated configuration, the axis of which is in alignment approximately with the planar format of the developer housing, that is, slightly inclined relative to the vertical. The screw conveyor 226 is mounted on a shaft 228 that has one end mounted for rotation in bearing 230 secured to an end wall 204 of the developer housing and the other end rotatably mounted in a bearing 231 secured in a hub 232 which, in turn, is secured to the inner surface of the conveyor tube 225 at that end thereof positioned within the return housing 227.

Developer material being conveyed by the screw 226 is carried within the housing 227 and to an opening 234 formed in the lower portion of the tube 225 within the housing 227. The opening 234 permits the egress of the developer material from the tube and directs the material into any one of a plurality of internal buckets 235 formed as part of an internal bucket conveyor belt 236 which encircles the tube 225 at this point.

Figure 5:
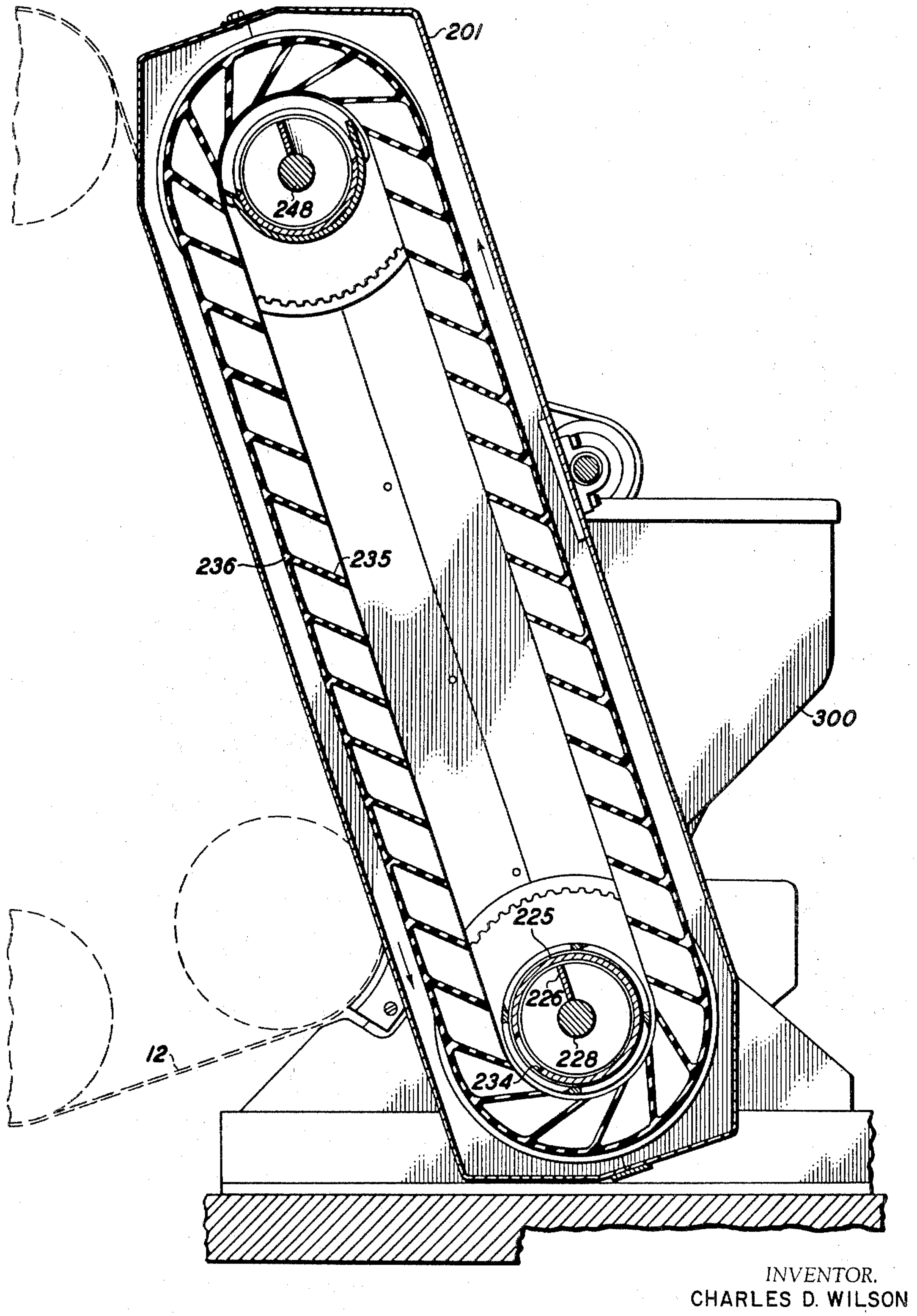
FIG. 5 is a cross-sectional view of the vertical transport taken along the line 5—5 in FIG. 4.

As the developing material is directed into the buckets 235, the belt 236 continuously moves in the direction shown by the arrow in FIG. 5 to bring the development material to a higher point above that in which cascade upon the selenium belt 12 will occur. Upon reaching its uppermost point, each of the buckets are drawn around a conveyor tube 245 extending through the return housing 227 through a slot 246 formed in the upper portion of the tube. As the buckets 235 are moved upwardly and around the tube 245 and when the opening slots of the buckets are in register with the opening 246, the development material is adapted to be poured from each of the buckets and into the interior of the tube 245.

The tube 245 is similar to the tube 225 and serves to contain a conveyor screw 247 which serves to convey developing material horizontally from the developer return housing 227 and into the developer housing 200 preparatory to movement of the developer material into cascading position. During operation of the developer assembly, the lower conveyor screw 226 and the upper conveyor screw 247 are driven in unison in opposite directions and, are adapted to convey each in its own direction as indicated by the arrow, approximately the same quantity of development material in order to prevent the advancement of movement of development material of one of the screw conveyors over the other. The material is poured from each of the buckets 235 in the belt 236 and through the opening 246 into the interior of the tube 245 whereupon the development material is conveyed horizontally to be spread across the entire length of a longitudinal slot 273 formed in a lower region of the tube 245 that extends into the developer housing 200.

From the foregoing description of the developer material return system, it will be appreciated that the system is adapted to retrieve previously cascaded development material and to convey the same horizontally, that is, perpendicular in direction to the free fall cascading motion of the development material, thence to convey the material vertically in a line perpendicular to the previous stage of horizontal and conveyance, to bring the development material to a higher level preparatory to the cascading action. After the development material is brought to a higher plane, it is once again conveyed horizontally and positioned to assume a continuous relatively long, flat sheet or shower of fallen developer material which disposed for cascading action over the selenium belt 12.

As the development material is poured out of the slot 273 (see FIG. 7) the material is directed into an elongated hopper 280 mounted upon the upper plate 220 in the upper region of the developer housing 200. Some of the developer material falls by gravity through an opening 285 formed in the support plate 220 for purposes to be described hereinafter.

The development material leaving the passageway 284 continues its downward movement and flows between the chute 211 and the selenium belt in position to begin the cascade development function. The developer material falls in the form of a thin, wide sheet of falling particulate material to be influenced by the electrical charge on the belt 12 and the field charge between the belt and the electrode 210.

As the developing mixture is cascaded over the xerographic belt 12, toner particles are pulled away from the carrier beads and deposited on the belt to form powder images, while the partially denuded carrier beads and excess toner pass off the belt and into the developer housing 200 by way of the pick-off baffle 202 as previously described. As toner powder images are formed especially for solid area development additional toner particles must be supplied to the developing mixture in proportion to the amount of toner deposited on the selenium belt. To supply additional toner particles to the developing mixture, the toner dispensing system 15 is utilized to accurately meter toner to the developing mixture within the lower portion of the developer housing 200.

Referring now to FIGS. 4, 6, 9 and 16 toner dispenser 15 comprises a hopper or toner container 300 into which is contained a relatively large supply of toner particles that may be poured into the container from an external source through a suitable cover 301.

The container 300 is formed as a truncated bin having a lower discharge nozzle section 302 through which toner is fed into the lower conveyor tube 225. Control of the flow of toner in accordance with the density characteristic of developed images is in the form of a toner plate 303 and a metering gate 304, the latter being mounted for reciprocatory movement across the lower opening of the nozzle 302.

The metering gate 304 is mounted in a carriage 305 which is mounted for reciprocatory movement in order to move the metering gate 304 relative to the toner plate 303 and thereby produce controlled flow of toner from the container 300 into the lower conveyor tube 225.

The container 300 rests upon a frame structure 306 which has a slightly enlarged, generally rectangular shape similar to that of the nozzle section 302. Actually the nozzle section 302 fits into the interior of the frame structure which comprises longitudinally extending side frame elements 307 and 308, and end elements 309. The lower edges of the side elements 309 are formed with circular edges 310 adapted to rest upon adjacent edges of the lower screw conveyor tube 225 and may be arranged to prevent the leakage of toner material between the edge 310 and the tube during flowing of the toner particles.

The end elements 309 are also formed with deep recesses which terminate in a flat plane surface 311 having a width slightly larger than the width of the toner plate 303 and which accommodate the ends of this plate. Each end of the plate 303 is provided with adjusting set screws 312 which are suitably rotated to position the corresponding end of the plate 303 relative to the surface 311. A lock screw 313 is slidably received through a suitable opening in each end of the plate 303 and adapted to be threadedly received in a tapered opening formed in the lower section of each of the end elements 309. The set screw 313 is formed with a shoulder engageable with the top surface of the plate 303 and when turned down serves to lock the plate upon the surface 311, being spaced therefrom by the set screws 312. The set screws 312 serve as adjusting devices for the plate 303 in relation to the relatively fixed metering plate 304 in order to maintain the spacing between these plates at a predetermined distance which may be set in accordance with the toner material and the diameter of the individual particles thereof.

Figures 9, 10:
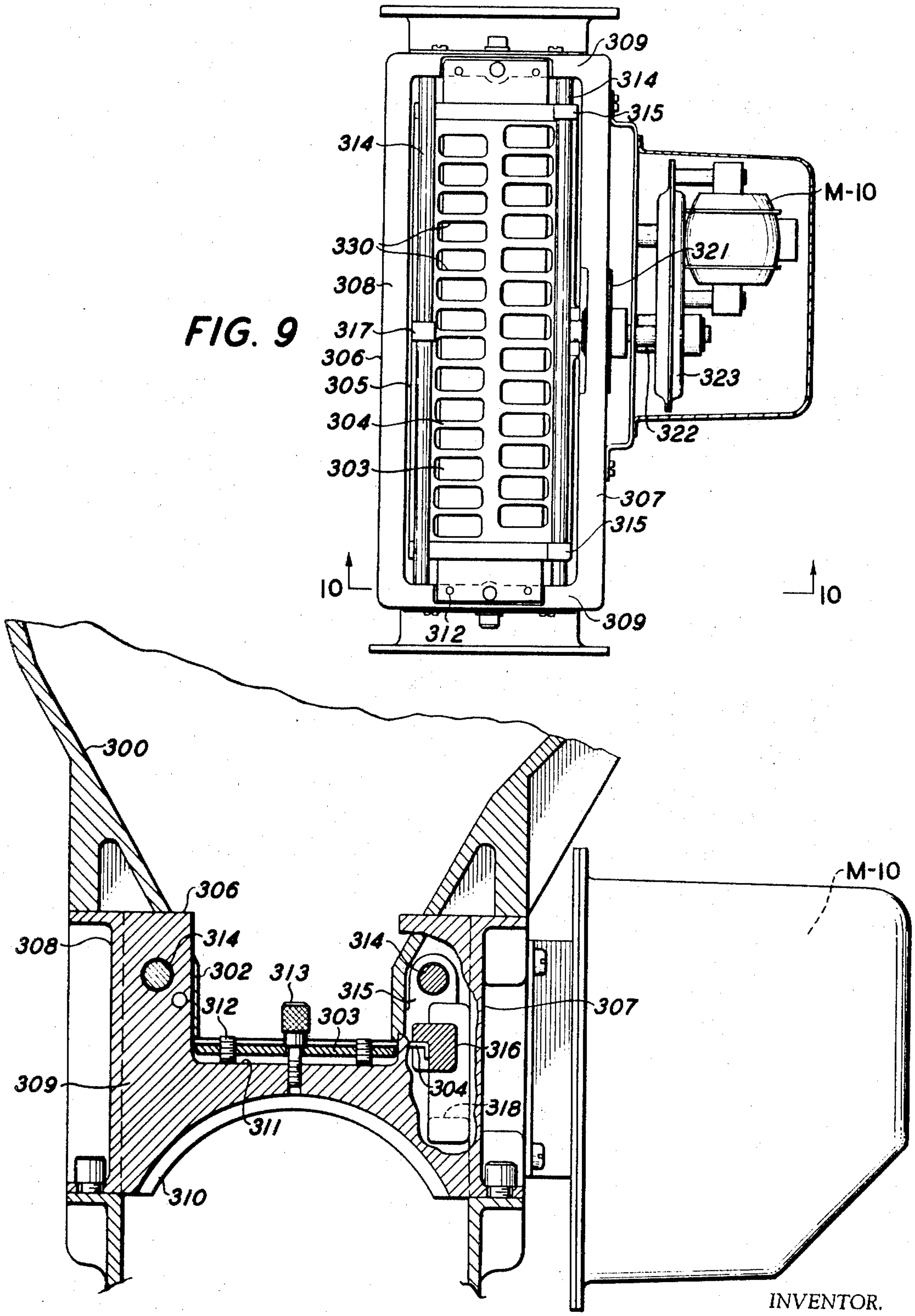
FIG. 9 is a plan view partly in section of the toner dispensing mechanism.
FIG. 10 is an enlarged sectional view, partly broken away, of the toner dispenser, taken along the line 10—10 in FIG. 9.
Figure 11:
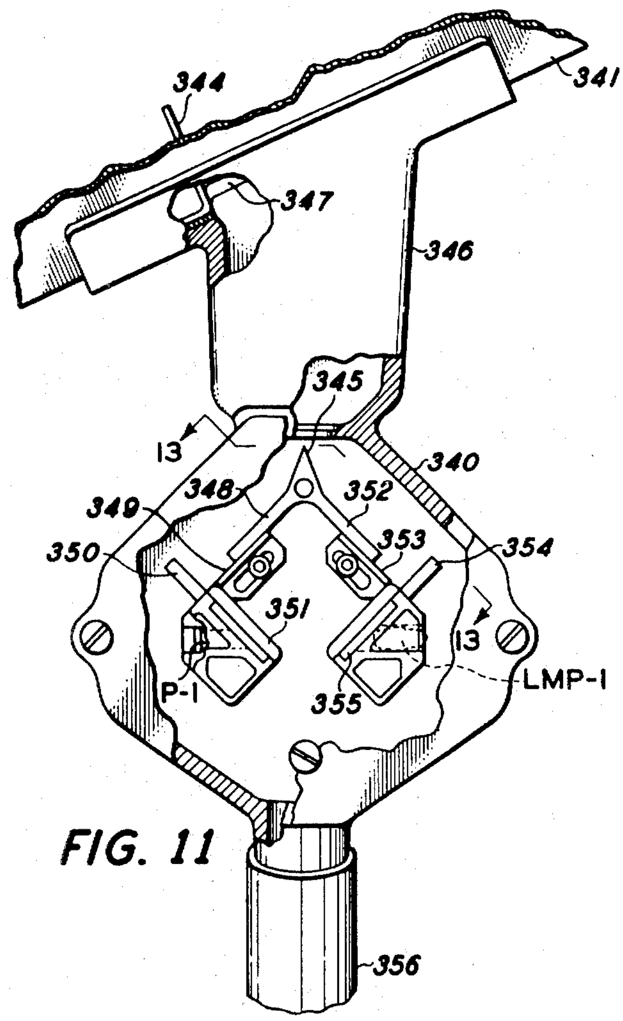
FIG. 11 is an elevational view, with parts broken away, of the toner sensor control device used in the developer assembly.
Figure 12:
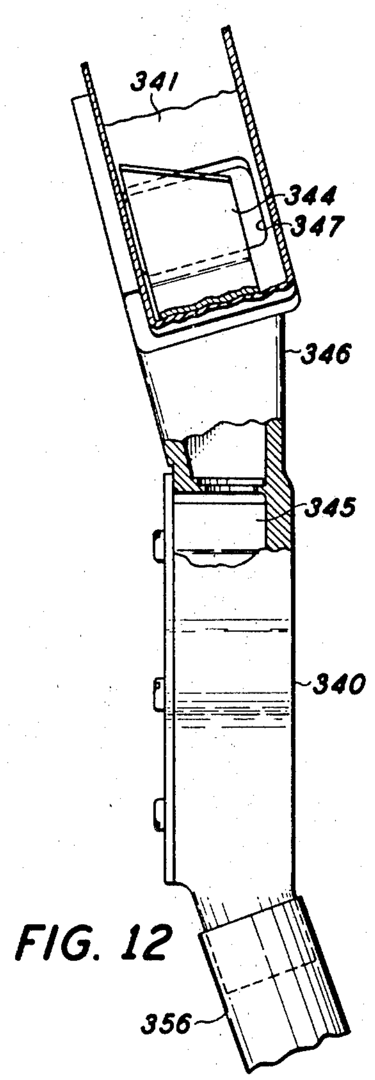
FIG. 12 is a side view of the toner sensor with parts broken away.
Figure 13:
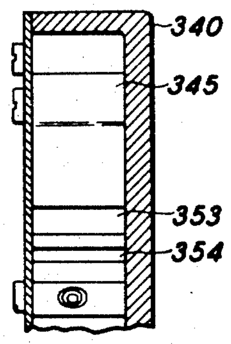
FIG. 13 is a cross-sectional view taken along the line 13—13 in FIG. 11.

As previously stated, the carriage 305 is mounted for reciprocatory motion relative to the nozzle section 302 for imparting corresponding motion to the metering gate 304. In order to accomplish this reciprocatory motion the frame structure 306 is provided with a pair of guide rods 314 mounted with their axes in parallel, in spaced relation on either side of the nozzle section 302 and slightly above the position of the gate. The rods 314 are suitably retained within apertures formed on both of the end elements 309. As shown in FIG. 10, the carriage 305 includes end slide elements 315 which are connected at the ends of a longitudinally extending frame 316 to which the metering gate 304 is attached. The frame 316 is also provided with a rear upstanding slide element 317 through which the rear guide rod 314 extends. The rods 314 support the carriage 305 by means of the two end elements 315 and the rear element 317 in a sliding relationship in order to permit reciprocatory motion by the carriage.

In order to impart motion to the carriage 305, a front frame section of the frame 316 is provided with a vertically extending slot 318 formed in a central portion between the end elements 315. The slot 318 is adapted to slidably receive a drive pin 320 secured off center relative to a rotatable drive element 321 which in turn is secured to the drive shaft 322 extending from a gear reduction box 323 which derives its power from a motor M–10. Upon energization of the motor M–10, the gear box 323 imparts motive force to the drive element 321 for producing circular orbital movement of the drive pin 320. Since the drive pin 320 is confined within the vertical slot 318, as the pin orbits, the carriage 305 will reciprocate in a horizontal plane a total distance equal to the diameter of the orbital movement of the pin 320. Energization of the motor M–10 for this purpose is under control of a toner sensor control to be described hereinafter.

Figure 4:
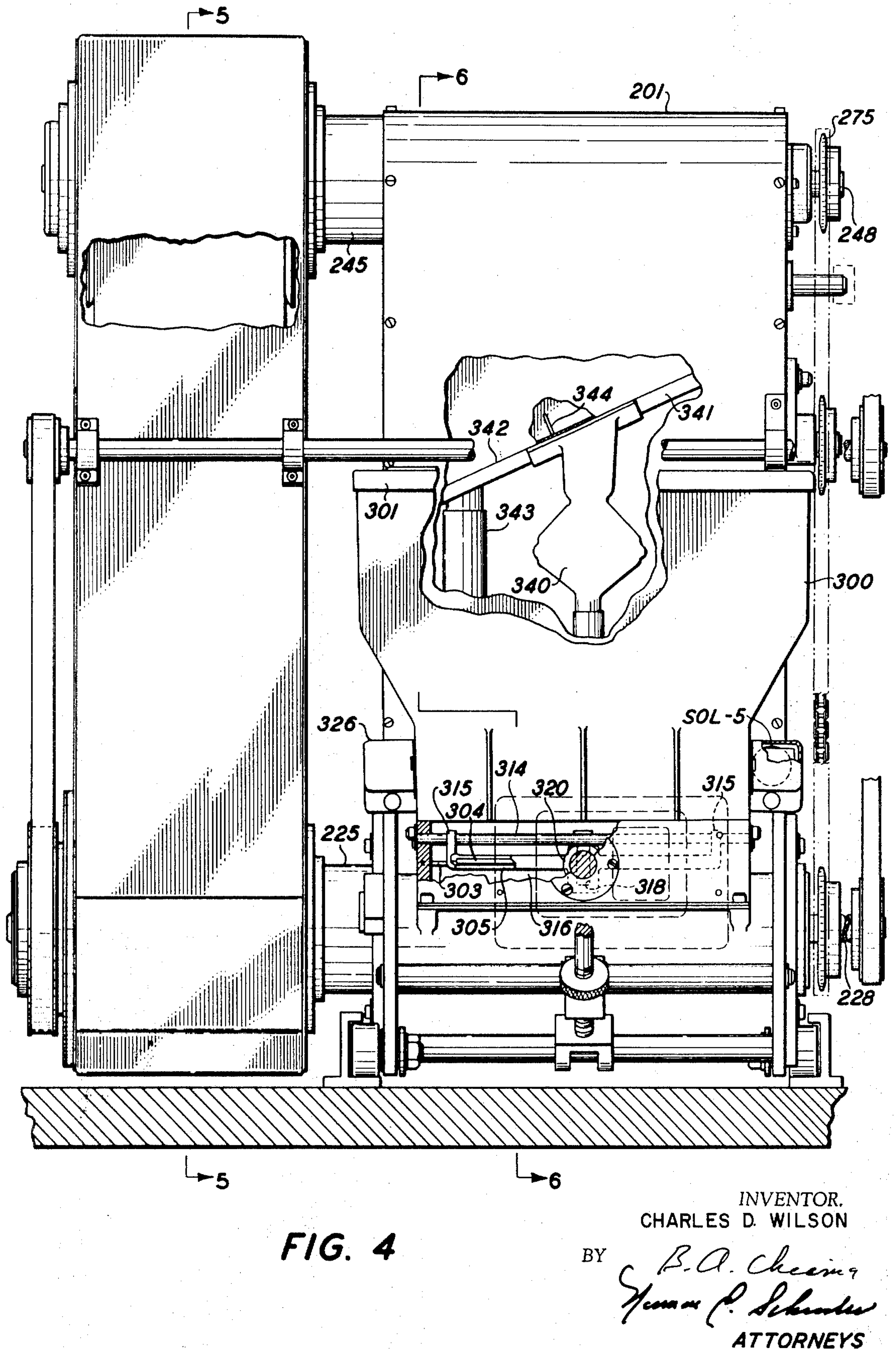
FIG. 4 is a rear elevational view of the developer housing with parts broken away to show a toner sensor device and a toner dispensing apparatus.

The toner container 300 is also provided with a periodically energized solenoid on each side thereof. As shown in FIGS. 4 and 6 a pair of solenoids SOL–5 are mounted on each side of the container 300 and are contained in suitable housings 326. Each solenoid is provided with a weight 327 attached to the armature for the solenoid and a spring 328 held in compression between the weight and the solenoid coil for normally biasing the weight outwardly to the outer extent of movement for the armature. Upon energization of the solenoids, the respective armature is drawn inwardly to force its associated weight toward the solenoid coil against the bias of the spring 328. Upon release of energization of the solenoid the weight will be driven under action of the spring to its extreme outer position. As will be described hereinafter, a control circuit is provided for energizing the solenoids SOL–5 periodically in order to impart quick motion to the weights 327 to produce a slight hammering upon the toner container 300 thereby preventing impaction of the toner particles and constantly maintaining the downward movement of toner for eventual egress through the nozzle section 302. Normally in the operation of the toner dispenser, with a supply of toner particles placed within the container 300, the metering plate 304 and the toner plate 303 form a control gate for holding back the toner particles from entering the conveyor tube 225 through the tapered nozzle section 302 of the container. Upon reciprocation of the gate 304 by the rotation of the drive element 321, a metered quantity of toner particles will be permitted to pass through the double row of large openings 330 formed in the gate 304 and to fall upon the stationary plate 303. With toner particles being built up upon the plate 303, a metered quantity of toner will steadily cascade over the two longitudinal edges of the plate from where the toner will fall into the tube 225. Since the width of the toner plate 303 is greater than the internal width of the nozzle section 302, the latter prevents the toner particles from falling directly through the openings 330 and into the tube 225 without first falling upon the plate 303 to be metered thereby. The toner then actually follows a tortuous path as shown in FIG. 6 by the reference numeral T indicating a typical path of toner fall.

Since the toner dispenser 15 dispenses a uniform quantity of toner for a given stroke length of the metering gate 304, it is apparent that the quantity of toner delivered by the toner dispenser may be varied by the number of strokes of such movement per unit of time. Accurate control of the dispensing rate for the toner dispenser can be accomplished by controlling the time in which the motor M–10 is energized and the rate of reciprocation of the gate 304, the latter activity being determined by the gear reduction ratio for the gear box 323. Assuming that the gear box is adapted to rotate the drive shaft 322 at approximately 50 r.p.m., it will be seen that the metering gate 304 will experience relatively few reciprocatory cycles for any particular time during which the motor M–10 is energized. It will be apparent with the foregoing arrangement then that more accurate control is available with the use of a relatively slow reciprocating movement of the metering plate 304 since only the motor energization period which can be relatively broad in view of this slow movement, need be varied to control toner dispensing.

In order to control the dispensing of toner from the toner dispenser 15, there is shown in FIGS. 11–18, the details of an automatic toner control system which ultimately controls the time of energization for the dispenser motor M–10 at start up and during continuous operation of the machine.

Basically, the automatic toner dispensing system comprises a toner sensor 340 mounted within the developer housing 200 by any suitable means which electrically grounds the sensor, a flat funnel bin 341 which conveys some of the developer material passing through the slot 285 in the plate 220 into the sensor 340. As shown in FIG. 6 developer material entering the bin 341, slides downwardly to the left along the inclined plane 342 of the bin on its way to a bypass conduit 343. The plate 342 supports an upstanding deflector plate 344 in the path of the downwardly moving material. The conduit 343 is arranged to conduct the flow of the developer material that does not enter the sensor 340 back into the lower conveyor tube 225 for continued circulation of the material.

The toner sensor 340 is generally square in shape having a relatively narrow depth, and resembling a flat box-shaped housing. It is arranged such that diagonal corners are aligned with the vertical in order to permit the flow of toner into the upper corner and to permit egress from the sensor from the diagonally placed lower corner. Within the sensor housing, there is positioned at the upper corner of the housing, a triangular shaped baffle element 345 which has the apex of a corner thereof facing upwardly into the path of the free-falling developer material which flows through a conduit 346 connected between the upper corner of the housing and an opening 347 formed in the bin 341. The angled element 345 serves to split the downwardly flowing developer material into two separate paths of approximately equal flowing widths. The developer material flowing along the left path, as viewed in FIG. 11, slides along one leg 348 of the angled element 345 and along an extension of the leg in the form of an adjustable control gate 349 until the development material has its flow obstructed by a guide baffle plate 350 positioned 90° relative to the path of movement of the development material and the plane of the gate 349. The lower end of the control gate 349 is spaced from the guide plate 350 a narrow distance to permit a controlled amount of the developer material to change its direction of flow 90°, or toward the lower right corner as viewed in FIG. 11. Excess developer material, or that material which does not pass between the edge of the gate 349 and the plate 350, flows around the outer end thereof and to an outlet tube to be described. The developer material now slides in this direction along the guide plate 350 and onto a conductive glass plate 351 secured thereon and across which the developer material flows. A sensing photocell P–1 is secured to the sensor housing immediately below the plate 351 for a purpose to be described hereinafter.

Similarly, the element 345 has a second leg which is adapted to convey development material along another path of movement upon entering the sensor 340. This leg 352 is also provided with a projecting extension in the form of a control gate 353 which directs development material downwardly and to the right and against a second guide plate 354 positioned 90° to the flow of the development material in this trunk and relative to the gate 353. As was the case with the guide plate 350, a second conductive glass plate 355 is insulatingly attached to the plate 354 across which development material is directed as the material is permitted to flow through the lower edge of the gate 355 and the adjacent surface of the plate 354 in a controlled quantity manner. A lamp LMP–1 is mounted immediately below the plate 355 and arranged so that when energized, some of the lights rays therefrom will be transmitted through both NESA plates and impinge upon the photocell P–1.

The development material which has passed across the plates 351 and 355 and which pass as an overflow across the ends of the guide plates 350 and 354 are brought together again at the lower corner of the sensor housing 340 and into an outlet tube 356 which is in communication with this lower corner. The lower end of the pipe 356 is in communication with opening 224 formed in the lower conveyor tube 225.

Figure 14:
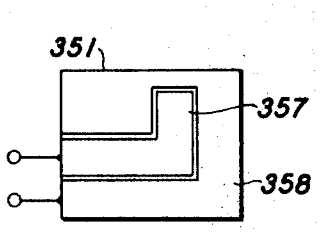
FIG. 14 is a fragmentary view of a detail in the toner sensor.

Each of the sensing plates 351 and 355 has a thin transparent layer of a conductive oxide, preferably formed of "NESA" glass, at trademark of the Pittsburgh Glass Company, which is generally a tin oxide coated glass that is transparent to white light. Since both plates are mirror images of each other, details of only one of the plates will be described. A pattern 357 is formed on the plate 351 as shown in FIG. 14 and is of L shape, being produced by scribing through the oxide layer in order to electrically separate the pattern 357 from the remaining portion 358. Each of the conductive portions 357, 358 are connected to a circuit to be described hereinafter.

In order to accumulate toner in an amount fairly indicative of the total amount of toner in the developing system, the patterns 357 on both plates 351 and 355 have applied thereto an electrical potential of a polarity and amount to attract and retain toner particles for some predetermined unit of time. During this time, the light transmission through the accumulated toner on both patterns 357 will be determined in terms of toner concentration for the developer material. When the predetermined unit of time has terminated and after the toner accumulation is sensed, the polarity on the patterns 357 of the sensing plates is reversed in order to permit the patterns to repel toner particles thereby effecting the cleaning of the patterns by means of the developer material allowed to continue flowing across the patterns brushing toner therefrom.

Figure 16:
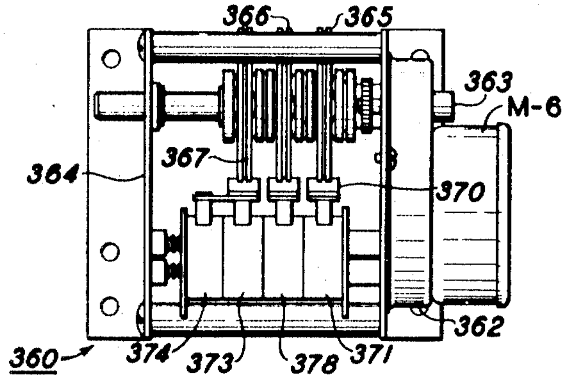
FIG. 16 is an elevational view of the timer mechanism for the toner sensor.
Figure 17:
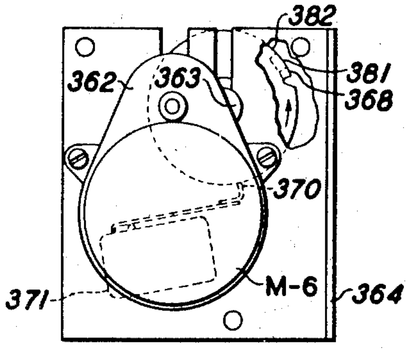
FIG. 17 is an end view of the timer mechanism for the toner sensor.
Figure 15:
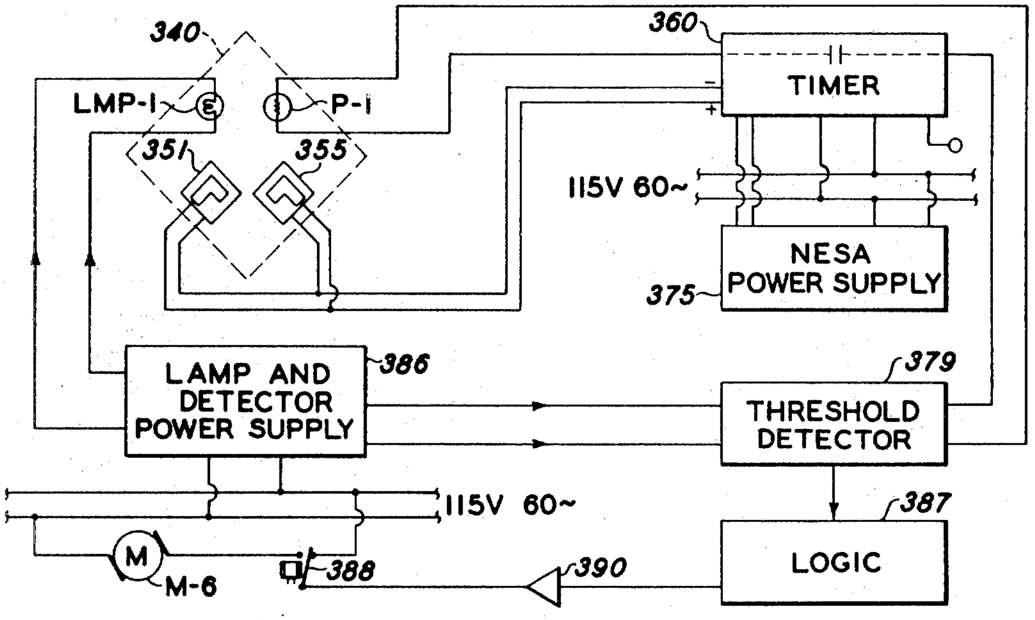
FIG. 15 is a schematic of the control circuit for the toner sensor of FIG. 11.

As shown in FIG. 15, the conductive portions of each of the plates 351, 355 are connected in parallel and to a timer mechanism generally indicated by the reference numeral 360 shown in detail in FIGS. 16 and 17. The timer mechanism 360 is in the form of a continuously rotating bank of cams which periodically make and break switches connected to the toner sensor circuit. The timer comprises a motor M-6 connected to a gear reduction drive mechanism 362 which has its output shaft connected to a shaft 363 rotably mounted on a frame 364 for the timer mechanism. The shaft 363 has mounted thereon for rotation therewith a first cam 365 for controlling the electrical supply to the timer drive motor M-6 during shutdown of the xerographic machine, a second cam 366 which control the time during which the accumulated toner on each of the plates 351 and 355 is sampled and, a third cam 367 which controls the polarity upon the plates 351, 355. The cam 365 assures that a positive polarity is applied to the patterns 357 whenever the sensor is "cycled out" for a purpose to be described hereinafter.

The first cam 365 is formed with a control lobe 368 which is arranged to actuate an actuator 370 for a switch 371 which is connected to a suitable source of electrical power supply to the timer motor M-6. This motor is energized whenever a main switch in the electrical circuit for the machine is closed and the drive for the horizontal conveyor screws 226 and 247 is activated. During the shutdown of the machine when it is still processing a last copy and when the drive to the conveyor screws 226, 247 has terminated, the switch 371 will maintain the motor M-6 energized for a complete sensing cycle which, as will be further described, lasts for about six seconds. The developer material used in this last cycle is furnished from the conduit 346 which serves as a sump for this purpose. Closing of the switch 371 assures shutdown of the motor M-6 only when the regions 357 have a positive polarity or that polarity opposite that of the toner particles utilized.

Before proceeding further in the description of the timer circuit a brief description of the sensing and non-sensing mode of operation for the toner sensor 340 will be described in relation to the timer 360 and the electrical power thereto.

The circuit for the toner sensor and the components thereto are arranged and programmed so that sensing of toner concentration occurs periodically and asymmetrically, that is, for a short, predetermined time interval, or, after a relatively long predetermined time period. For purposes of illustration of these time periods and controls, the sensor control circuit is adapted to "sample" or sense the toner concentration accumulated upon the patterns 357 for a period of one-tenth of a second, which period occurs after the patterns are in the "attract" mode for about four-tenths of a second prior to sampling. During the "attract" mode which encompasses the "sampling" period, the patterns 357 are of positive polarity or that polarity opposite the polarity on the toner particles. After approximately one-tenth of a second for the "sampling" period, the electrical power for this sensing function will be terminated until the next cycle. The cycle of placing the sensor in the "attract" condition, sampling, and cleaning the sensor occurs every six seconds when the xerographic machine is in the continuous print mode of operation. In the illustrated example, with the "attract" mode lasting approximately five-tenths of a second and the "clean" cycle five and one-half seconds, the toner density sensing is asymmetrical in its cycling.

Figure 18:
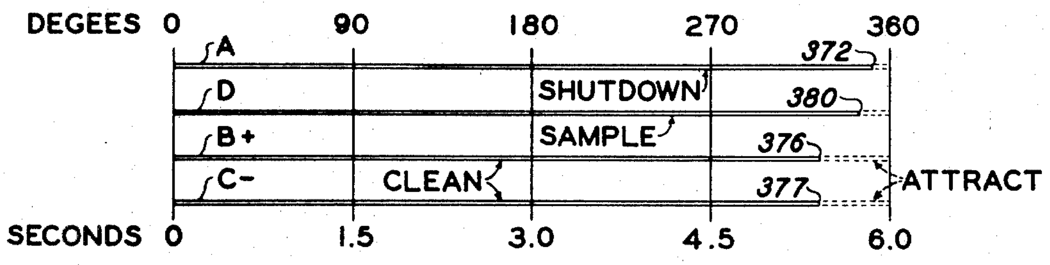
FIG. 18 is a timing chart indicating the operative sequence of the timer mechanism.

As shown in FIG. 18, there is illustrated a series of time graphs for a six second cycle of toner concentration sampling and control. During this six seconds, the output shaft 363 for rotating each of the cams 365, 366 and 367 makes one complete revolution. As previously stated, the switch 371 is actuated by the cam lobe 368 on the cam 365 and comes into service only for the last six second sensing cycle during processing of the last copy of a particular production run. The circular length of the lobe 368 is such as to maintain closing of the circuit to the timer motor M-6 for nearly the entire six second period and as shown in FIG. 18, the switch 371 is actuated to closed position until approximately 5.85 seconds has transpired or when the cam reaches the line 372 on the curve A. During use of the machine before the last copy is being processed, the switch 371 is bypassed. It is, in effect, an auxiliary A.C. path to assure shutdown in the "attract" mode. At the end of the six second period the switch 371 is again actuated to a closed condition commencing the next cycle of sensor control.

As shown by the time curve B, just prior to reaching the line 372, the cam 367 which actuates a normally closed switch 373 to an open position and a normally open switch 374 to a closed position causes these switches to be actuated such that the normally open switch 373 closes to cause the patterns 357 to be supplied with positive potential from the power supply 375, thereby holding the patterns in the "attract" mode. This "attract" mode will remain until the termination of the six second cycling period. This is illustrated in the timing curve B by the line 376. Simultaneous with this actuation of the switch 373 is the actuation of the normally closed switch 374 which when open prevents the flow of negative potential to the areas 358 of each of the sensor plates 351, 355. This occurrence is illustrated in time curve C by the line 377.

After the plates 351, 355 have been placed in the "attract" mode for approximately four-tenths of a second, the cam 366 actuates a switch 378 which controls activation of a control circuit in a threshold detector 379 for conditioning the photocell P–1 to vary its resistance in accordance with the intensity of the light rays from the continually energized lamp LMP–1. This "sample" period remains for approximately one-tenth of a second, starting from the sampling "ON" time when the photocell P–1 is energized, illustrated by the line 380 in time curve D. As shown in FIG. 17, the control end of the lobe 368 for the cam 365 is spaced angularly from the control end of the lobe 381 for the cam 366 and also spaced from the control end of the lobe 382 for the cam 367. The angular relationship between the lobes 382 and 381 is such as to permit the elapsed time between the beginning of the "attract" mode and the instant that the photocell P–1 is energized. The angular distance between the lobes 382 and 368 is such that the patterns 357 are energized to a positive potential before the motor M–6 is de-energized in the processing of a last copy.

For illustrative purposes, the polarity indicated in FIGS. 14 and 15 in relation to the sensing plates 351, 355 are those polarities of the supply voltage when the plates are in the "attract" mode. For this invention then, it was assumed that the charge upon toner particles is negative and, therefore, would be attracted to the control patterns 357 for each of the sensing plates. It is also assumed that the other conductive areas 358 are being supplied with negative D.C. potential. This electrical configuration is merely illustrative and has been chosen for descriptive purposes because of the particular charge chosen for the toner particles which, as previously stated, is negative. The positioning then of the actuator arms for the switches 373 and 374 is such that toner particles will be attracted to the patterns 357 and repelled from the patterns 358.

As previously stated, in order to exhibit high sensitivity and rapid response time, the electrical circuit shown in FIG. 15 is adapted for periodic sensing action, for every six second period during which the reproduction machine is in continuous operation. During the "attract" mode, the toner will accumulate upon the patterns 357 and, in an amount indicative of the amount of toner in the developer material. When the timer 360 has effected switching of the switches 373, 374 the polarity of the patterns 357 and the portions 358 are reversed whereupon the pattern 357 assumed a negative polarity and the portion 358 a positive potential. In this manner, the control patterns 357 will repel the toner cascading down the inclined plates 351 and 355 during this portion of the control cycle. When the polarity is thus reversed, the patterns 357 are cleaned by the cascading developer material and thereby is preconditioned during this "clean" cycle for another "attract" cycle.

In order to determine the extent of toner concentration that has accumulated on both control patterns 357, the toner sensor 340 is provided with the photocell lamp combination P–1 and LMP–1. As previously stated, the photocell is positioned adjacent the lower surface of the plate 351 so that toner particles cascading through the toner sensor and accumulating upon both regions 357 will intercept light rays from the lamp LMP–1 positioned behind the lower surface of the other plate 355. The photocell P–1 in effect will "see" light rays which traverse the cascading developer stream flowing upon both plates 351, 355 and the accumulated toner particles on each of the patterns 357.

Electrically the photocell P–1 is connected to the threshold detector 379 in the form of a Schmitt trigger 385 which is adapted to produce a pulse when the resistance in the photocell attains a predetermined value indicative of the intensity of the light rays that reach the photocell from the lamp LMP–1 during the "sample" cycle. The detector 379 derives its power from a power supply 386 which also supplies the lamp LMP–1 with its electrical energy.

The pulse generated from the Schmitt trigger 379 is fed to a machine logic circuit 387 which, when combined with other necessary signals from the reproduction machine, is fed to a timer relay 388 by way of an amplifier 390 and then to the toner dispenser motor M–10 connected in series with the relay contact for the relay 388. The timer relay 388 is arranged to remain "ON" for any adjustable predetermined timed period for each pulse thereto from the threshold detector 379. For each pulse fed to the timer relay, the motor M–10 will remain energized until the timer period, which may be in the range from 1–10 seconds, has terminated whereupon the motor M–10 will become de-energized for that pulse. As previously stated during energization of the motor M–10 the metering gate 304 is cyclically moved by means of the carriage 305.

During normal operation of the automatic toner dispensing apparatus, the light source LMP–1 is continuously energized for presenting light for both plates 351 and 355 arranged optically in series. The light rays which traverse both of these plates impinges upon the photocell P–1 which is compared with predetermined values in the Schmitt trigger 379. In the event that the predetermined value is not exceeded during the sampling step wherein the photocell is energized, the excess is utilized to produce a pulse which is fed to the logic circuit 387 as an indication that the toner concentration in the development material is below a desired level.

As the density of the toner that cascades over the sensing plates 351, 355 increases, the signal on the photocell P–1 will be in balance with the predetermined value in the Schmitt trigger 379 thereby terminating periodic energization of the motor M–10.

It will be appreciated that with the presence of both sensing plates 351 and 355, the sensitivity of the sensing circuit is relatively high since there is a much wider range of variation that light rays may experience in reaching the photocell P–1. This also results in the control of a relatively wide density range that the xerographic reproductions may attain, or in other words, the density that the toner concentration maintains can be closely regulated. With this narrow range of variations and with the continuous short sampling time per unit of time, the xerographic machine is capable of experiencing a relatively narrow, high quality contrast control since the slightest unbalance will demand toner and produce replenishment thereof.

The toner dispenser 15 functions to sift toner material into the development material in the conveyor tube 225 in order to insure maximum mixture of the fresh toner with the material already in the development process. The metering gate 304 and the toner plate 303, upon which toner particles fall, are of sufficient length as to span a relatively long length of the conveyor 226. The continual motion of the screw conveyor 226 brings the newly mixed development material into position to be carried upwardly by the vertical conveyor belt 236.

While there is in this application specifically described one form which the invention may assume in practice, it will be understood that this form of the same is shown for purposes of illustration, and that the invention may be modified and embodied in various other forms.

What is claimed is:

1. A toner control system for use in an electrostatic reproduction machine of the type utilizing a developing system adapted to apply electrostatically charged toner in developing material to electrostatic latent images thereby producing powdered toner images including sensing means associated with the developing system and arranged to be applied to developing material therein, said sensing means including an element which when in one condition of operation is adapted to attract toner thereto during an attract condition and to repel toner therefrom during a cleaning condition, means for sampling toner deposition during a sampling condition of the toner attracted to said element during said attract condition, and timer means associated with said sensing means and said element and arranged to place the same in said attract condition, said sampling condition and said cleaning condition in that order during successive predetermined time periods.

2. A toner control system for use in an electrostatic reproduction machine of the type utilizing a developing system adapted to apply electrostatically charged toner in developing material to electrostatic latent images thereby producing powdered toner images including an electrical element associated with the developing system and arranged to be applied to developing material therein, said electrical element including when in one condition of operation is adapted to attract toner thereto during an attract condition and to repel toner therefrom during a cleaning condition, means for sampling toner deposition during a sampling condition of the toner attracted to said element during said attract condition, and means associated with said electrical element arranged to place the same in said attract condition and said cleaning condition cyclically asymmetrically with the time period for the attract condition less than that for the cleaning condition.

3. In a toner control system for use in an electrostatic reproduction machine of the type utilizing a developing apparatus adapted to apply electrostatically charged toner in developing material to electrostatic latent images thereby producing powdered toner images and wherein the system includes means for introducing toner into the developing apparatus for replenishing the developing material with toner, an electrically energizable element arranged to be applied to developing material and which when energized with electrical energy of one polarity is adapted to attract and accumulate charged toner particles thereto, means for energizing the element with electrical energy of one polarity, and means for determining the developability of the material from toner accumulated on said element, the improvement comprising timer means associated with said energizing means and said element and adapted to effect energization of the element periodically with electrical energy of said one polarity thereby causing the accumulation of toner on the element for each period of energization.

4. The improvement of claim 3 wherein said energizing means being adapted to provide electrical power to said element having opposite polarity and, said timer means being adapted to cause energization of said element with electrical energy of said opposite polarity when the same is not energized with energy of said one polarity.

5. The improvement of claim 3 wherein said means for determining developability is associated with said timer means, the latter being adapted to activate the former for determining developability periodically.

6. The improvement of claim 3 wherein said timer means commences effecting energization of said element with energy of said one polarity at a point in time prior to activation of said means for determining developability of the developing material.

7. The improvement of claim 3 wherein said means for energizing the element with electrical energy is also adapted to provide said element with energy of opposite polarity to cause the repelling of toner therefrom, said timer means is arranged to recycle continuously the following sequence of operation during machine operation: energize said element with energy of said opposite polarity, energize said element with energy of said one polarity, activate said means for determining toner deposition, and then terminate the latter two operative steps substantially simultaneously.

8. The improvement of claim 3 wherein said circuit means for energizing the element is also adapted to provide said element with energy of opposite polarity thereby causing the repelling of toner therefrom, and said timer means is adapted to effect such energization between the periods during which said element is provided with energization of said one polarity, the period of energization of said one polarity being less than one-fifth as long as the period of energization of said opposite polarity.

References Cited

UNITED STATES PATENTS

| | | | |
|---|---|---|---|
| 3,196,831 | 7/1965 | Sugarman | 118—637 |
| 3,399,652 | 9/1968 | Gawron | 118—637 |
| 3,409,901 | 11/1968 | Dost et al. | 118—637 |
| 3,430,606 | 3/1969 | Pease et al. | 118—637 |

ROBERT B. REEVES, Primary Examiner

H. S. LANE, Assistant Examiner

U.S. Cl. X.R.

118—637; 222—76